(12) United States Patent
Potin

(10) Patent No.: US 6,715,150 B1
(45) Date of Patent: Apr. 6, 2004

(54) VISOR FOR A HELMET

(75) Inventor: Laurent Potin, Bordeaux (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 09/926,273

(22) PCT Filed: Apr. 7, 2000

(86) PCT No.: PCT/FR00/00898

§ 371 (c)(1),
(2), (4) Date: Oct. 4, 2001

(87) PCT Pub. No.: WO00/63737

PCT Pub. Date: Oct. 26, 2000

(30) Foreign Application Priority Data

Apr. 16, 1999 (FR) .............................. 99 04820

(51) Int. Cl.⁷ ................ A61F 9/00; A42B 1/08
(52) U.S. Cl. ......................... 2/15; 2/9; 2/424
(58) Field of Search .................. 2/424, 6.5, 6.3, 2/6.4, 15, 6.7, 10, 427, 431, 9; 351/41, 175, 159, 176

(56) References Cited

U.S. PATENT DOCUMENTS

| | | | | |
|---|---|---|---|---|
| 1,536,828 A | * | 5/1925 | Drescher ............... | 351/176 |
| 1,741,536 A | * | 12/1929 | Rayton ................ | 351/159 |
| 3,870,405 A | * | 3/1975 | Hedges ................ | 359/631 |
| 4,601,533 A | * | 7/1986 | Moss .................. | 359/24 |
| 4,682,856 A | * | 7/1987 | Holdridge ............. | 359/894 |
| 4,755,023 A | * | 7/1988 | Evans et al. .......... | 345/8 |
| 4,867,550 A | * | 9/1989 | Jannard ............... | 351/47 |
| 5,103,323 A | * | 4/1992 | Magarinos et al. ...... | 359/8 |
| 5,432,623 A | * | 7/1995 | Egan et al. ........... | 359/15 |
| 5,467,480 A | | 11/1995 | Baudou et al. | |
| 5,623,730 A | | 4/1997 | Baudou et al. | |
| 5,689,323 A | * | 11/1997 | Houston et al. ........ | 351/41 |
| 5,722,091 A | * | 3/1998 | Keller et al. ......... | 2/6.3 |
| 5,742,937 A | | 4/1998 | Baudou et al. | |
| 5,815,848 A | * | 10/1998 | Jarvis ................ | 2/424 |
| 6,009,564 A | * | 1/2000 | Tackles et al. ........ | 2/436 |
| 6,010,217 A | * | 1/2000 | Houston et al. ........ | 351/159 |
| 6,014,769 A | | 1/2000 | Baudou et al. | |
| 6,262,849 B1 | | 7/2001 | Potin et al. | |
| 6,304,386 B1 | | 10/2001 | Potin | |
| 6,361,166 B1 | * | 3/2002 | Perrott et al. ........ | 351/159 |
| 6,412,945 B1 | * | 7/2002 | Grove et al. .......... | 351/159 |

* cited by examiner

Primary Examiner—Rodney M. Lindsey
(74) Attorney, Agent, or Firm—Oblon, Spivak, McClelland, Maier & Neustadt, P.C.

(57) ABSTRACT

Visors for helmets are generally of spherical shape and of constant thickness, and articulated to the side walls of a helmet at the level of the forehead, about an axis of articulation passing through the center of their sphere. Thus shaped and mounted, they are seen off axis by a helmet wearer leading to optical distortions for him caused by diffraction effects on their internal and external faces. Visors with shapes modified to minimize the optical distortions perceived by a helmet wearer are proposed here. A first type of modification consists of a relative pivoting, in the vertical plane, of one of the faces of the visor with respect to the other and of a slight reduction in the ratio of the radius of curvature of the outer face of the visor to that of the inner face of the visor compared to the usual concentric bispherical visor. A second type of modification consists of adopting one or two aspherical surfaces of particular shape. A third type of modification consists of using a holographic diffraction mask fixed to one of the faces of the visor.

11 Claims, 9 Drawing Sheets

VISOR FOR A HELMET

The present invention relates to helmets with a protective visor and especially those equipped with an optical image-projection system making it possible to display in front of the helmet wearer's eyes, a synthetic image superimposed onto his view of the external world.

This sort or helmet must comply with a certain number of restrictions, especially size restrictions since it is intended to be used in limited spaces such as the cockpit of an aircraft or of a helicopter and weight and kinetic moment restrictions in order to limit fatigue in the neck of the wearer. These restrictions lead to the components of the image projection system being lightened as much as possible and to them being placed as close as possible to the center of gravity of the wearer's head.

The components of an image projection system for a helmet are in general dispensed with, with the exception of the optical combiner making it possible to superimpose the projected synthetic image onto the scenery in front of the helmet wearer's eyes, at the upper periphery of the helmet since they should not encroach upon the visual space of the helmet wearer, nor impinge on the lower periphery of the face of the helmet wearer, which is reserved for any respiration equipment (oxygen mask). The synthetic image generated by the image projection system is therefore applied to the combiner placed in front of the helmet wearer's eyes from an optical system occupying the forehead region.

Moreover, the helmet is still equipped with one or more adjustable protective visors, for example, a visor for mechanical protection against wind, dust, etc. and a visor for optical protection against the sun or laser attack. This or these movable protective visors are completely detachable or they retract by pivoting above the helmet wearer's head, passing above the components of the image projection system placed in the forehead region. In order to take up less space when they are moved into place and retracted, it is usual to give the visors a generally spherical shape and to articulate them on the helmet about an axis of rotation placed in the forehead region of the helmet and passing through the center of their sphere. In addition, for ease of manufacture, the visors, which are generally obtained by thermoforming a transparent plastic sheet of uniform thickness, often have a final concentric bispherical shape with a constant thickness and two faces: a spherical and concentric internal face and external face.

The positions of the helmet wearer's eyes are offcentered laterally and downward with respect to the center of the spheres of the external and internal faces of the visors, by angles exceeding 20°. These offcenterings mean that the light rays reaching the helmet wearer's eyes pass through the walls of the visors at angles far from the normal and, on passing through these walls, they undergo refraction phenomena causing offsets and image distortions.

Thus, the helmet wearer notices both that the image of the scenery which he can see is offset upward and that this image is distorted when he puts a visor in place.

The offset introduced by a visor varies with the direction in which the helmet wearer looks, since the value of the angle of offcentering depends on this direction. It is about 0.4° when he looks straight ahead and rapidly gets worse when he looks sideways or downward. This offset has the drawback of playing on the superposition perceived by the helmet wearer between a synthetic projected image and the scenery that he can see.

Hitherto, the offset and the image distortions due to visors were ignored, the offset since it had no significant effect on the accuracy of the designation systems using a helmet visor and the image distortions since the helmet wearer can be satisfied most of the time with a reduced visual space by orienting his field of view by displacing his head rather than by displacing his eyes.

With the improvement in accuracy of the designation helmet visor systems, the effect of image offsets due to the presence of the visors on the sighting errors can no longer be ignored.

The offset introduced into the viewing axis by the protective visor or clear visor is easy to take into account. This is because, since this visor is generally kept in the lowered position during the whole mission, it is possible to take into account once and for all the offset that it introduces by an offset in the same direction of the synthetic projected image.

The offset introduced into the viewing axis by the additional optical protective visors is more problematic since the helmet wearer tends to place or retract these visors depending on the lighting conditions encountered or on the laser threats which may be very variable during one and the same mission. If one attempts to compensate for it by offsetting the synthetic projected image in the same direction, this can only be done when these visors are lowered, which means that the positions of these visors must be detectable at all times. This position detection can be obtained by equipping the helmet with visor position sensors, but that is against the general concern of lightening the helmet.

In addition, compensating for the offset of the scenery due to the presence of visors by a similar offset of the synthetic projected image has to be done according to the viewing direction of the helmet wearer since the value of the offcentering angle and therefore of the offset depends thereon. It would be possible to consider detecting the ocular position of the helmet wearer and offsetting the synthetic image by the value observed in the direction sighted by the helmet wearer, but this dynamic correction of the synthetic image is difficult to receive by the helmet wearer who sees a synthetic image which seems to undulate with the direction in which he looks.

Compensation only of the offset means that the image distortion due to the visors is not corrected, which is moreover particularly problematic for night or infrared viewing systems since it leads to poor superposition of the synthetic image with the scenery perceived through the visor. In order to improve this superposition, it would be possible to consider making the synthetic image subject to a similar distortion by image processing, but that would require the introduction of much too heavy optical or digital correction means on the helmet.

The aim of the present invention is to combat the aforementioned drawbacks by acting on the optical properties of the protective visors.

The subject of the invention is a protective visor for a helmet with a transparent wall having two faces, one internal, the other external, of generally spherical shape remarkable in that it comprises optical means for reducing angular offsets perceived through it by the helmet wearer.

Advantageously, said optical correction means consist of a relative axial displacement between the two spherical faces of the visor wall giving a variable thickness to this wall and leading to a prismatic effect correcting the angular offset perceived by the helmet wearer when he looks through the visor in a predetermined direction.

Advantageously, said optical correction means consist of a relative axial displacement of the external face of the visor with respect to the inner face in a vertical plane.

Advantageously, said optical correction means consist of an axial displacement upward through an angle of about half a degree of the outer face of the visor with respect to the inner face of the visor.

Advantageously, said optical correction means consist of reducing the ratio of the radius of curvature of the outer face of the visor to the radius of curvature of the inner face of the visor compared to that of a concentric bispherical visor of constant thickness.

Advantageously, said optical correction means consist of varying the ratio of the radius of curvature of the outer face to that of the inner face of the visor by about 1/100th compared to a concentric bispherical visor of constant thickness.

Advantageously, said optical correction means consist of adopting a spherical face and an aspherical face for the visor, the aspherical face approaching a theoretical shape minimizing the distortions, obtained by calculation on the basis of a spherical shape approximated by polygonal facets, each facet being reoriented so as to correct the angular offset that it imposes on the light rays reaching the helmet wearer's eyes, the reoriented facets being repositioned in depth, each one with respect to the others, starting with the center of the visor and finishing at the edges, in order to obtain a surface having minimum roughness and the faceted surface obtained being smoothed by the calculation.

Advantageously, said aspherical face approaching a theoretical shape minimizing the distortions, obtained by the calculation, is of the toric type.

Advantageously, said optical correction means consist of adopting, for the visor, two aspherical faces obtained in two steps on the basis of two initially spherical faces, a first aspherical face being determined during a first step by approximating a first theoretical shape minimizing the distortions inherent to the initial spherical shapes, this first theoretical shape being obtained by calculation on the basis of a spherical shape approximated by polygonal facets, each facet being reoriented so as to correct the angular offset that it imposes on the light rays reaching the helmet wearer's eyes, the reoriented facets being repositioned in depth, each one with respect to the others, starting with the center of the visor and finishing at the edges, in order to obtain a surface with minimum roughness and the faceted surface obtained being smoothed by the calculation, and a second aspherical face being obtained during a second step by approximating a second theoretical shape minimizing the distortions inherent to the spherical-aspherical shape obtained during the first step, this second theoretical shape being obtained by calculation on the basis of a spherical shape approximated by polygonal facets, each facet being reoriented so as to correct the angular offset that it imposes on the light rays reaching the helmet wearer's eyes, the reoriented facets being repositioned in depth, each one with respect to the others, starting with the center of the visor and finishing at the edges, in order to obtain a surface having minimum roughness and the faceted surface obtained being smoothed by the calculation.

Advantageously, said aspherical faces approaching theoretical shapes minimizing the distortions, obtained by calculation, are of the toric type.

Advantageously, said optical correction means consist of a relative axial displacement between the two spherical faces of the visor leading to a prismatic effect correcting the angular offset perceived by the helmet wearer when he looks through the visor in an arbitrary direction and of adopting a ratio of the radius of curvature of the outer face of the visor to the radius of curvature of the inner face of the visor which is less than that of a concentric bispherical visor of constant thickness.

Advantageously, said optical correction means consist of a relative axial displacement between the two faces of the visor leading to a prismatic effect correcting the angular offset perceived by the helmet wearer when he looks through the visor in an arbitrary direction and of adopting, for the visor, a spherical face and an aspherical face configured, relative to the spherical face, so as to reduce the residual angular offsets in a region of the visor centered on said arbitrary direction.

Advantageously, said optical correction means consist of a relative axial displacement between the two faces of the visor leading to a prismatic effect correcting the angular offset perceived by the helmet wearer when he looks through the visor in an arbitrary direction and of adopting, for the visor, a spherical face and an aspherical face of the toric type configured, relative to the spherical face, so as to reduce the residual angular offsets in a region of the visor centered on said arbitrary direction.

Advantageously, said optical correction means consist of a relative axial displacement between the two faces of the visor leading to a prismatic effect correcting the angular offset perceived by the helmet wearer when he looks through the visor in an arbitrary direction and of adopting, for the visor, two aspherical faces configured one with respect to the other so as to reduce the residual angular offsets in a region of the visor centered on said arbitrary direction.

Advantageously, said optical correction means consist of a relative axial displacement between the two faces of the visor leading to a prismatic effect correcting the angular offset perceived by the helmet wearer when he looks through the visor in an arbitrary direction and of adopting, for the visor, two aspherical faces of the toric type configured, one with respect to the other, so as to reduce the residual angular offsets in a region of the visor centered on said arbitrary direction.

Advantageously, said optical correction means consist of a holographic diffraction mask affixed to one of the faces of the visor and determined so as to equalize the direction, at every point of impact on the visor, of the light rays collected by the helmet wearer's eyes, before and after they have passed through the visor.

Advantageously, the holographic diffraction mask is affixed to the external face of the visor.

Advantageously, the holographic diffraction mask is assigned to the color green.

Other characteristics and advantages of the invention will emerge from the description below of several embodiments given by way of example. This description will be given with reference to the drawing in which.

Figure 1:
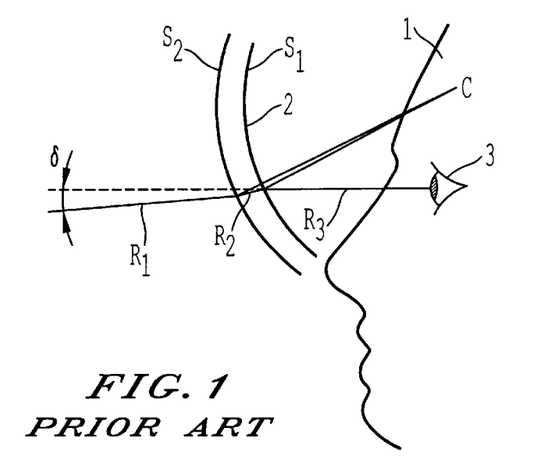
FIG. 1 is a sectional view showing the angular offset of the sighting axis introduced by the presence of a conventional bispherical protective visor with constant thickness inserted in front of an observer's eyes placed off-axis.

FIG. 1 illustrates, in profile, the position of the eyes of a helmet wearer whose face has the reference 1, with respect to a protective visor 2 articulated in the conventional manner, in the closed position. This protective visor 2, which may be a mechanical or optical protective visor, has a more or less transparent wall of constant thickness and spherical shape and is articulated to the edges of the forehead part of the helmet, along an axis of articulation passing through the center of its spherical shape.

This spherical shape and this arrangement adopted, in the usual manner, for a visor comply with various restrictions including the need to leave some space free in front of the forehead part of the helmet in order to house any optical components of a projection system writing a synthetic image to an optical combiner placed in front of at least one of the helmet wearer's eyes and the desire for the visor to take up less space in the closed position, in the raised position or during transition between the closed and raised position. Other conditions connected to the presence of an optical image projection system in the forehead part of the helmet, such as the need to remove from the field of view noise images coming from the optical image projection system so that the direct vision is not disturbed, also argue in favor of such a shape and of such an arrangement for a protective visor.

Moreover, with regard to questions of ease of manufacture (the possibility of production by simple thermoforming of a transparent plastic sheet of uniform thickness), the visor 1 has a wall of constant thickness, with a concentric spherical inner face S1 and outer face S2. This is called a concentric bispherical shape.

In FIG. 1, the protective visor 2, with its concentric bispherical shape, its constant thickness and its usual arrangement, is illustrated, in vertical section, by two concentric circular arcs S1 and S2 physically embodying its internal and external faces, placed in front of the profile of the helmet wearer's face 1, with their common spherical center C impinging on the forehelmet wearer's head. It is then noted that a light ray R reaching the eye 3 of the helmet wearer through the visor undergoes two refractions, a first when it enters the wall of the visor 2 by its external surface S2 and a second when it leaves the wall of the visor 2 by its internal surface S1 since it approaches, in both cases, the external and internal surfaces of the visor 2 at angles of incidence which are far from the normal angles of incidence, the latter being directed toward the forehead and not toward the helmet wearer's eyes. As a result of these two refractions, the light ray R follows a solid line R1, R2, R3 and moves away from the straight line by an offset angle δ.

Figure 2:
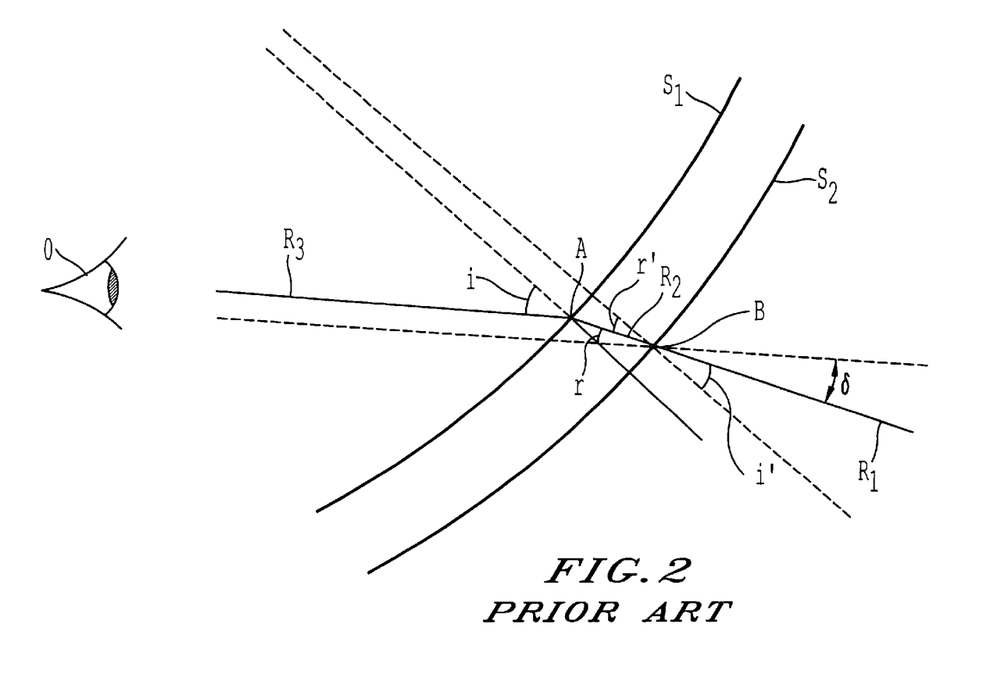
FIG. 2 is a diagram detailing the refraction phenomena responsible for the angular offset of the sighting axis.

FIG. 2 details the dual refraction phenomenon affecting a light ray reaching the helmet wearer's eyes looking through a concentric bispherical visor arranged according to the usual configuration illustrated in FIG. 1.

The eye 0 of the helmet wearer is placed off axis with respect to the concentric bispherical visor. The light ray R which reaches it therefore undergoes, on crossing the internal S1 and external S2 surfaces of the visor, two refractions causing it to follow the path given by the solid line R1, R2, R3. It arrives at the outer surface S2 of the visor at an angle of incidence i' where it is refracted a first time. It then enters within the wall of the visor at an angle of incidence r', before reaching the inner surface S1 of the visor. Because of the concentric bispherical shape of the visor, it reaches the inner surface S1 of the visor at another angle of incidence r and is refracted in the direction of the eye 0 of the helmet wearer at an angle of incidence i.

Each refraction obeys Snell's law such that:

$$\sin i' = n \sin r'$$

$$\sin i = n \sin r$$

Since the concentric bispherical visor is viewed off axis, the light ray observed strikes the internal S1 and external S2 surfaces of the visor at points A and B which are not on the same radius of the sphere of the visor wall. This has two consequences:

The angles of incidence r, i at the point of impact A and the angles of incidence r', i' at the point of impact B refer to different nonparallel normals, The angles of incidence r and r' of the light ray at the ends of its path in the wall of the visor are not equal.

As a result, the angles of incidence i' and i of the light ray on entering and exiting the visor are themselves unequal and also refer to different nonparallel normals. The two phenomena act in opposite directions but the fact remains that the direction of the light ray is modified by the presence of the visor at a certain offset angle which can be determined on the basis of a simple geometric optics calculation within the competence of a person skilled in the art.

With the usual values, a concentric bispherical visor with a radius of about 10 cm, constant thickness of about 2 mm, made of a transparent polycarbonate with an index of about 1.5, seen by the helmet wearer at an angle of axial displacement of about 25°, which corresponds to the position of the eye of an observer looking straight ahead, the presence of the visor leads to a downward angular offset of about 4 milliradians.

More generally, the angular offset occurs in a plane containing the light ray in question and the normals to the internal S1 and external S2 faces of the visor at the entrance and exit points of the ray in question on the visor, and depends on the offcentering angle of this ray. If the light ray placed in the axis of the field of vision of the helmet wearer is considered, it has an offcentering angle which depends on its point of impact on the visor and therefore on the orientation of the helmet wearer's eyes with respect to the visor.

Figure 3A:
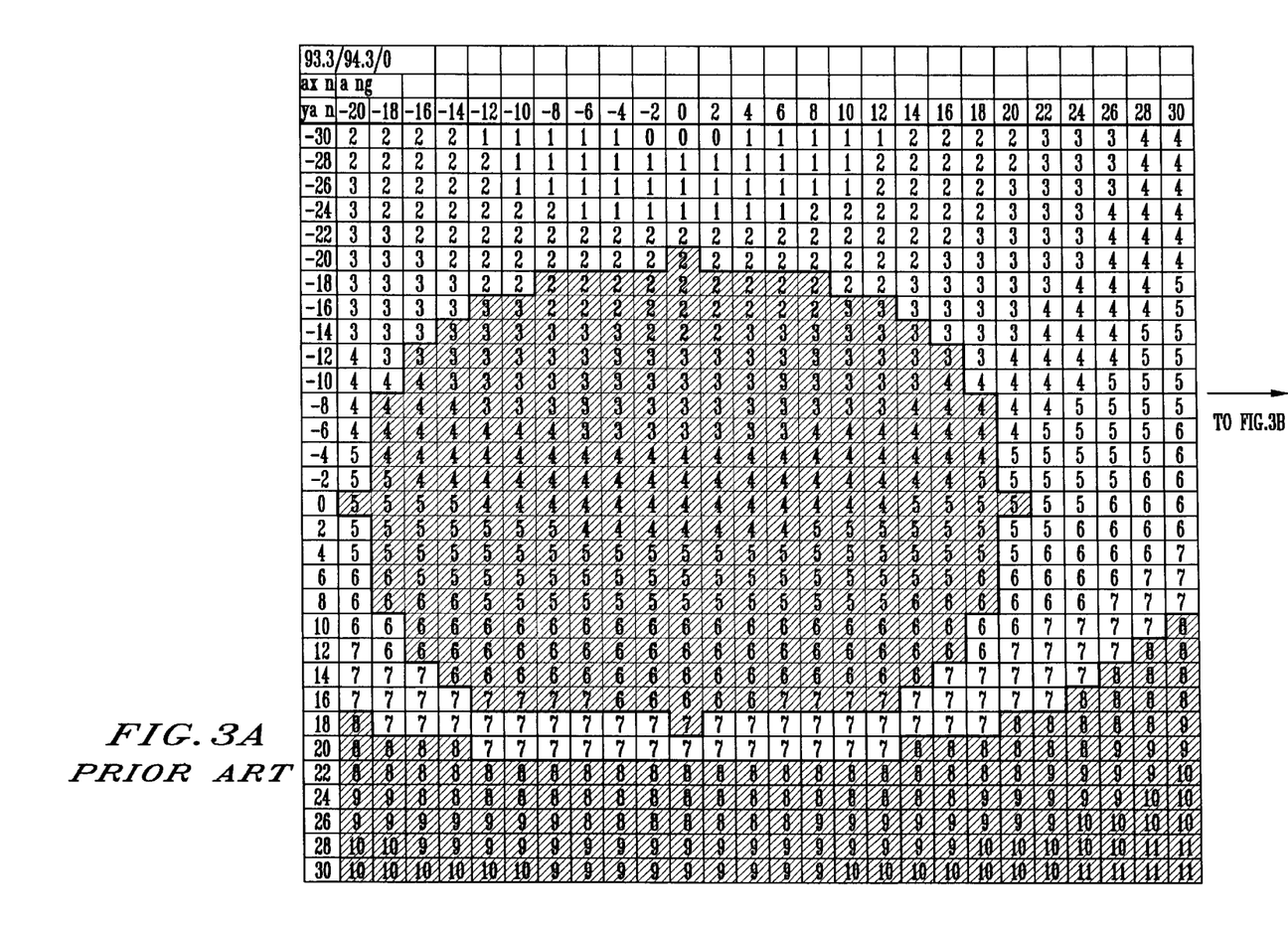
FIGS. 3A–3B is a measurement table mapping the angular offsets of the sighting axis caused by the use of a conventional bispherical visor of constant thickness, according to the orientation of the helmet wearer's eyes.
Figure 3B:
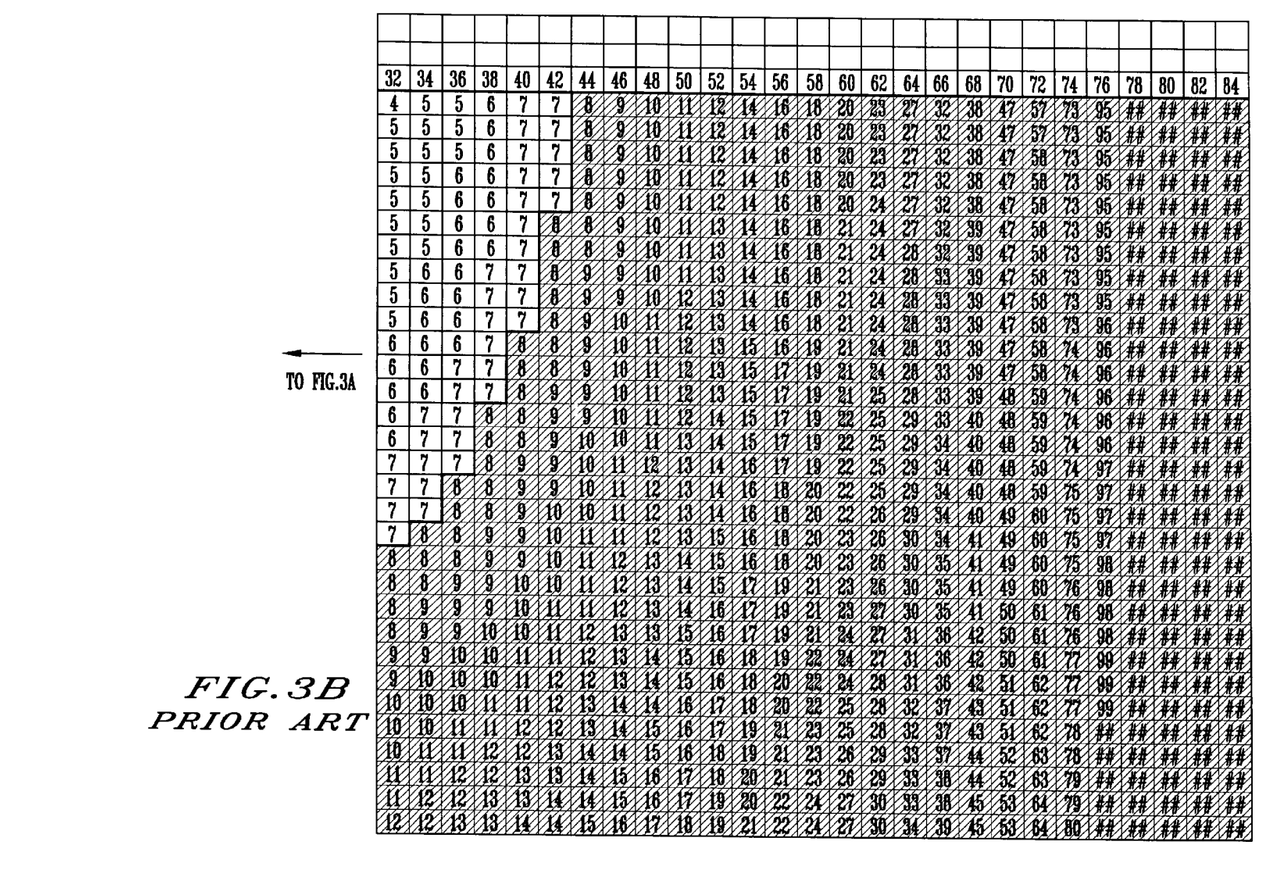

FIGS. 3A–3B is a table showing an example of mapping the angular offsets in milliradians that could be encountered with the aforementioned example of a concentric bispherical visor, according to the orientation of the helmet wearer compared to a reference visor in an angular coordinate system expressed in degrees showing the azimuth angle on the x-axis and the elevation angle on the y-axis.

Note that the angular offset is quite variable and that it increases gradually when the helmet wearer looks sideways or downward in the visor. The variations of angular offset as a function of the direction of vision lead, for the helmet wearer, to a distortion of the scenery which reduces the width of his field of vision and causes him to keep looking in a direction close to the axis of the visor. He then has to compensate for the narrow width of his field of vision by head movement.

Figure 4A:
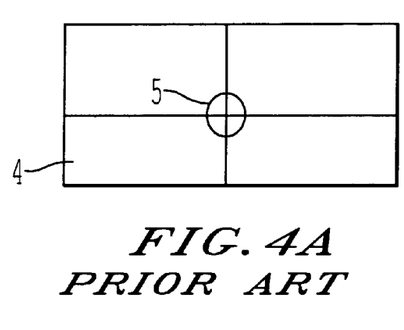
FIGS. 4a and 4b show the effect of introducing a conventional protective visor in front of the eyes of a person wearing a helmet with an image projection system, the projected synthetic image being physically embodied by a reticule and the scenery by a positioning circle.
Figure 4B:
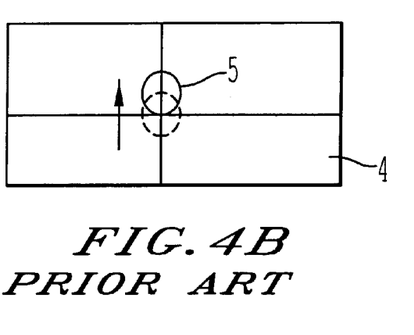

When he drops his visor, the helmet wearer has the impression of seeing the scenery go up. This has no particular drawback in the absence of sighting apparatus using an optical synthetic-image projection system mounted directly on the helmet. In contrast, in the presence of such an optical system, putting the visor in place results in a rise of the scenery compared to the synthetic projected image. This is because, when the synthetic projected image comprises a sighting reticule, the latter is not superimposed, for the helmet wearer, at the same point of the scenery when the visor is in place than when it is not in place. FIGS. 4a and 4b illustrate this phenomenon. FIG. 4a shows a reticule 4 from a synthetic image generated by an optical projection system mounted directly on the helmet and perfectly centered on an object seen in the scenery in the absence of the visor and physically embodied by a circle 5. FIG. 4b illustrates the transformation of the situation in FIG. 4a for the helmet wearer as soon as the visor is put in place. The synthetic image and its reticule 4 have not moved. In contrast, the scenery and therefore the circle physically embodying the object are displaced upward. When the helmet wearer realigns the reticule on the apparent object, he then makes a designation error from the angular offset introduced into his perception of the scenery by the presence of the visor. Since designation systems are becoming more and more accurate, the error due to the presence of the visor can no longer be ignored.

In order to reduce it, it is proposed to act on the optical properties of a visor. A first measure consists in introducing a compensating prismatic effect at the center of the field of vision of the helmet wearer where the reticule of the synthetic image is displayed by tilting the internal S1 and external S2 faces of the visor, one with respect to the other about a horizontal axis passing through this center of the field of vision. The tilt consists, for example, in making the external face S2 of the visor pivot downward about the horizontal axis in question by a suitable value, bearing in mind that a tilt of angle α introduces a prism of angle α which, when the angle α is small, which is the case, gives an angular offset d where:

$$d = (n-1)\alpha$$

Using the values adopted above, an index of 1.5 and an angular offset of 0.4 milliradians to be corrected, the external face of the visor S2 has to be pivoted with respect to the internal face S1 by an angle of about 0.4°.

Figure 5:
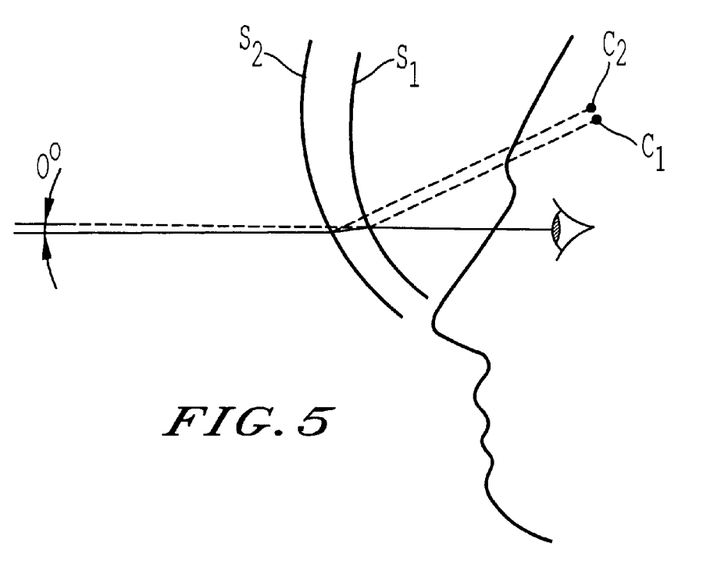
FIG. 5 is a vertical section of a bispherical visor showing the geometry adopted, with axial displacement of the faces, in order to prevent an angular offset in the axial direction.

FIG. 5 shows the effect of such pivoting on the profile of a visor. The latter sees the center C2 of its external spherical face S2 dissociated from the center C1 of its internal spherical face S1 and slightly displaced upward. It no longer has a constant thickness but a variable thickness which increases from the bottom upward. For visor with a mean thickness of 2 mm, it is possible to design a variation in thickness of 1 to 3 mm from the bottom upward.

Figure 6A:
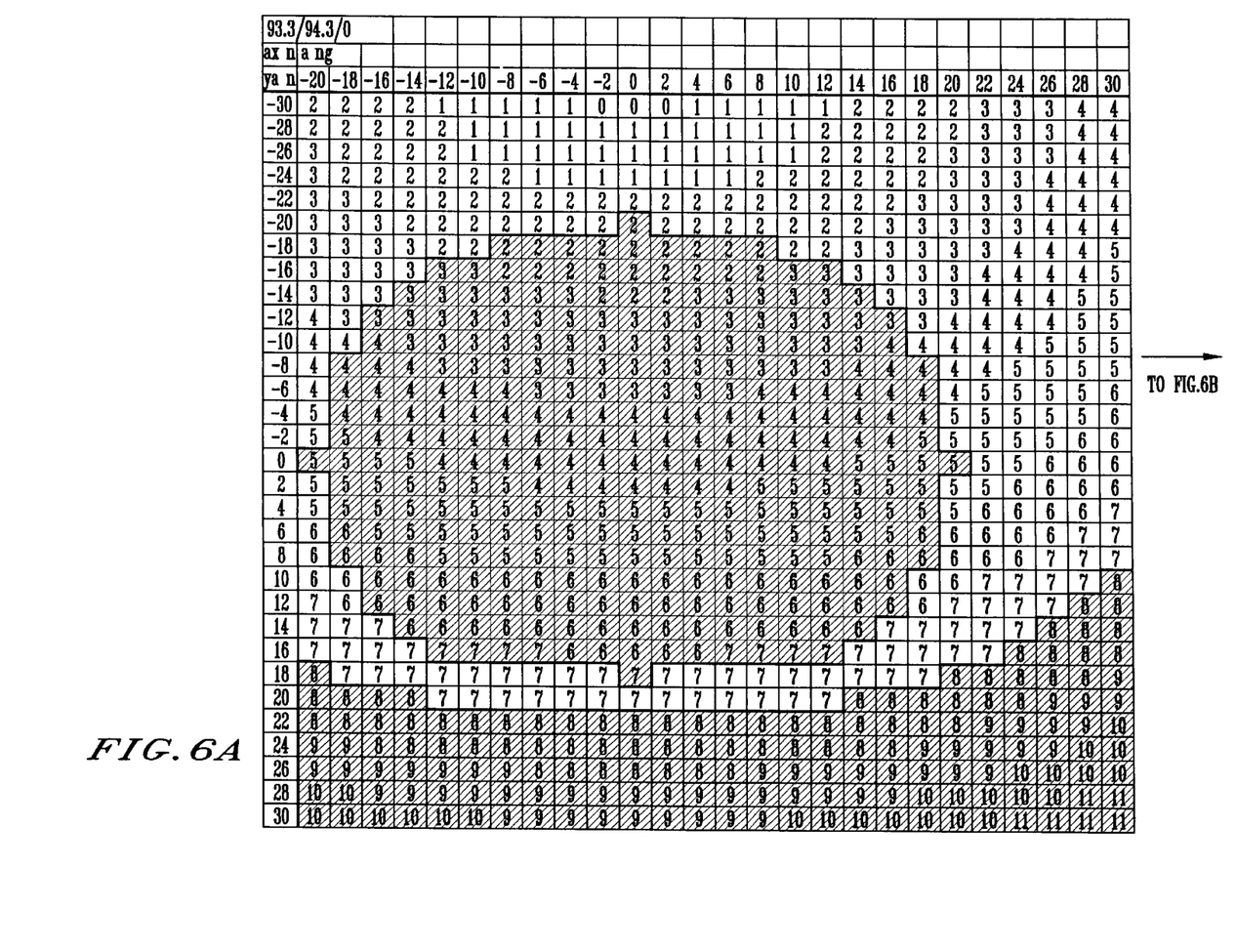
FIGS. 6A–6B is a measurement table mapping the angular offsets of the sighting axis where a visor having a geometry according to that illustrated in FIG. 5 is used according to the orientation of the helmet wearer's eyes.
Figure 6B:
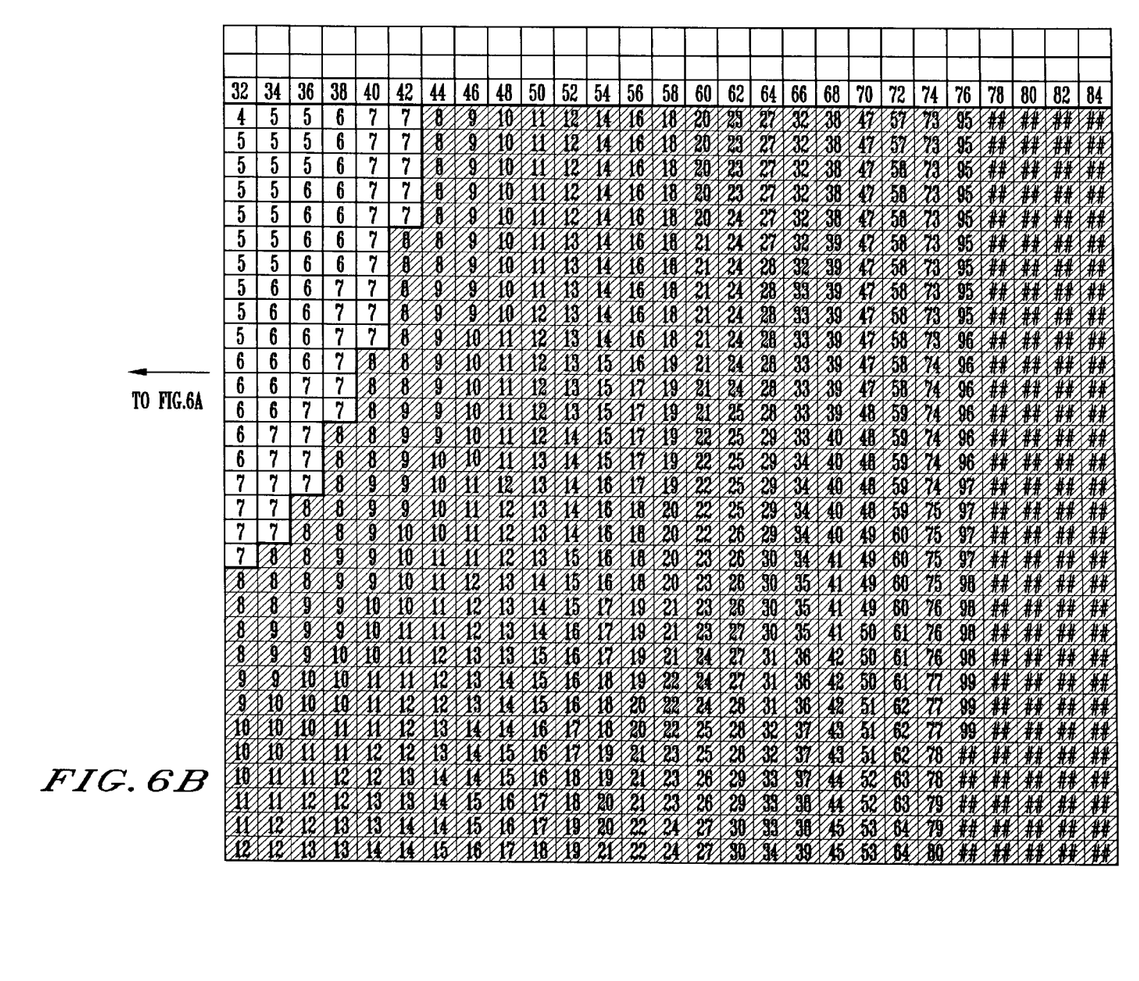

FIGS. 6A–6B is a table mapping the angular offset obtained with a visor to which a pivot has been added between the external S2 and internal S1 faces in order to obtain a correction of the angular offset in the direction of the helmet axis (vision of the helmet wearer in the azimuth 0 and the elevation 0 with respect to the visor). It should be noted that the desired correction of angular offset is properly obtained but that this only takes place over a region of narrow spread centered on the azimuth 0 and the elevation 0.

It should be noted that the prism with a very small angle (0.4°) at the apex, introduced between the two faces of the visor in order to correct the angular offset in a favored direction, here that corresponding to the axis of the helmet, leads only to a very small dispersion of the fundamental components of white light, well below the eye's sensitivity threshold, and does not cause any appreciable discoloration of the scenery.

In the case of a solar protection visor, tinted throughout, the fact that it is thicker towards the top than towards the bottom gives it a variable light alternation which decreases from the top downward. This decrease is an advantage since it matches the transmission of the visor to the brightness of the scenery, the brightest regions of the scenery corresponding to the sky and being seen through the upper part of the visor.

The problem of decentering, with respect to the scenery, of a reticule generated by a synthetic image and centered on the azimuth 0 and the elevation 0 with respect to the visor has been resolved. However, the visor continues to cause optical distortions of the same order as before, reducing the width of the helmet wearer's field of vision. The table of FIG. 6 shows that although the angular offsets have been reduced in the downward direction of the visor, they have been made slightly worse in the sideways and upward direction of the visor.

In order to combat the optical distortions of the visor, it is proposed to act on the shape of one or both faces of the visor.

Firstly, the internal face of the visor is not affected, since it may have its shape imposed by other considerations. It may indeed act as an optical combiner (semitransparent mirror) for an optical synthetic-image projection system mounted on the helmet and may, in this capacity, have an imposed shape.

The theoretical shape to be given to the external face of the visor in order to correct the local angular offsets noted in the table of FIG. 6 is then sought. One way of proceeding consists in approximating the binocular vision to monocular vision by replacing the two helmet wearer's eyes by a cyclops eye placed in the middle of his forehead and in approximating the outer spherical face of the visor to a surface of plane polygonal facets, each facet being small enough so that it is not discernible to the eye. The paths of rays reaching the cyclops eye after passing through each of the facets of the outer face of the visor and the angular offsets undergone by these rays are then determined by geometric calculations. From these, the prismatic corrections to be imposed on each of the rays, that is to say the corrections in orientation to be imposed on each of the facets of the outer face of the visor, are then deduced. After reorienting, the facets are readjusted in depth, starting with the one at the center of the visor so as to join up together as well as possible and to decrease as much as possible the roughness of the overall shape obtained. This operation of readjustment is made possible by the fact that the angular offsets vary in a monotone way as a function of the orientation of the rays with respect to the visor. In this way, a new shape for the outer face of the visor is obtained on the basis of reoriented and readjusted facets. This new shape defined by continuous functions refined piecewise is then smoothed by mathematical processing leading to an aspherical shape which is theoretically the one giving the minimum distortion to the visor.

This theoretical aspherical shape which has been devised for the outer face of the visor may turn out to be difficult to produce. For this reason, it may be approximated to a greater or lesser extent.

Firstly, it is possible to try to approximate it using a spherical shape. The outer face of the visor then keeps its spherical shape and its orientation with respect to the internal spherical face but its radius of curvature is modified so as to better approach the theoretical aspherical shape (obtaining a minimum for the sum of quadratic errors remaining between the two shapes).

Figure 7:
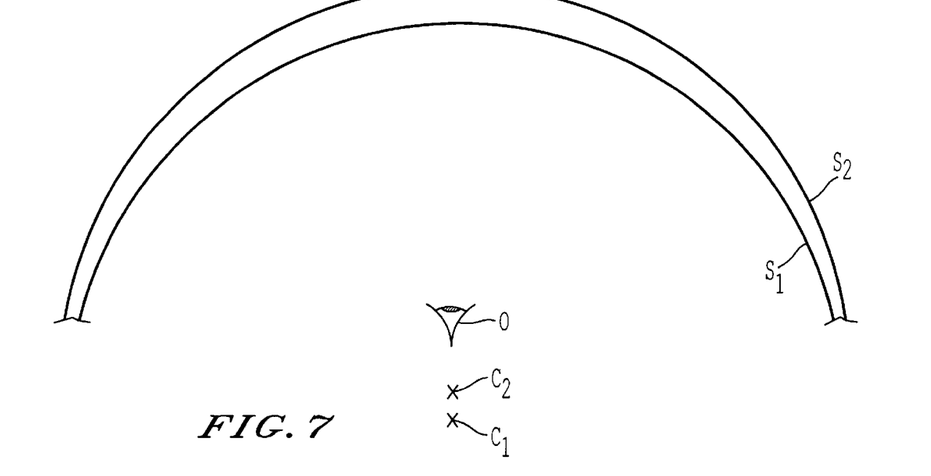
FIG. 7 is a horizontal section of a bispherical visor according to the invention showing the geometry adopted, with modification of the ratio of the radius of curvature of the faces, in order to reduce the optical distortions caused by the visor.

FIG. 7 is a view in horizontal section of a visor obtained in this way. It can be seen that the two external S2 and internal S1 faces of the visor are spherical but the radii of curvature of these faces are no longer in a ratio such that the thickness of the visor is constant but in a ratio giving the visor the profile of a slightly converging lens, which is thicker at its center than at its ends. Designed in this way, a visor with a thickness of 2 mm at its center has a thickness of about 1 mm at the edges and at its bottom and a thickness of about 3 mm at its top. The ratio of the radius of curvature of its outer face to the radius of curvature of its inner face is reduced here by an amount of about 1/100th compared to that of a bispherical visor of constant thickness.

Figure 8A:
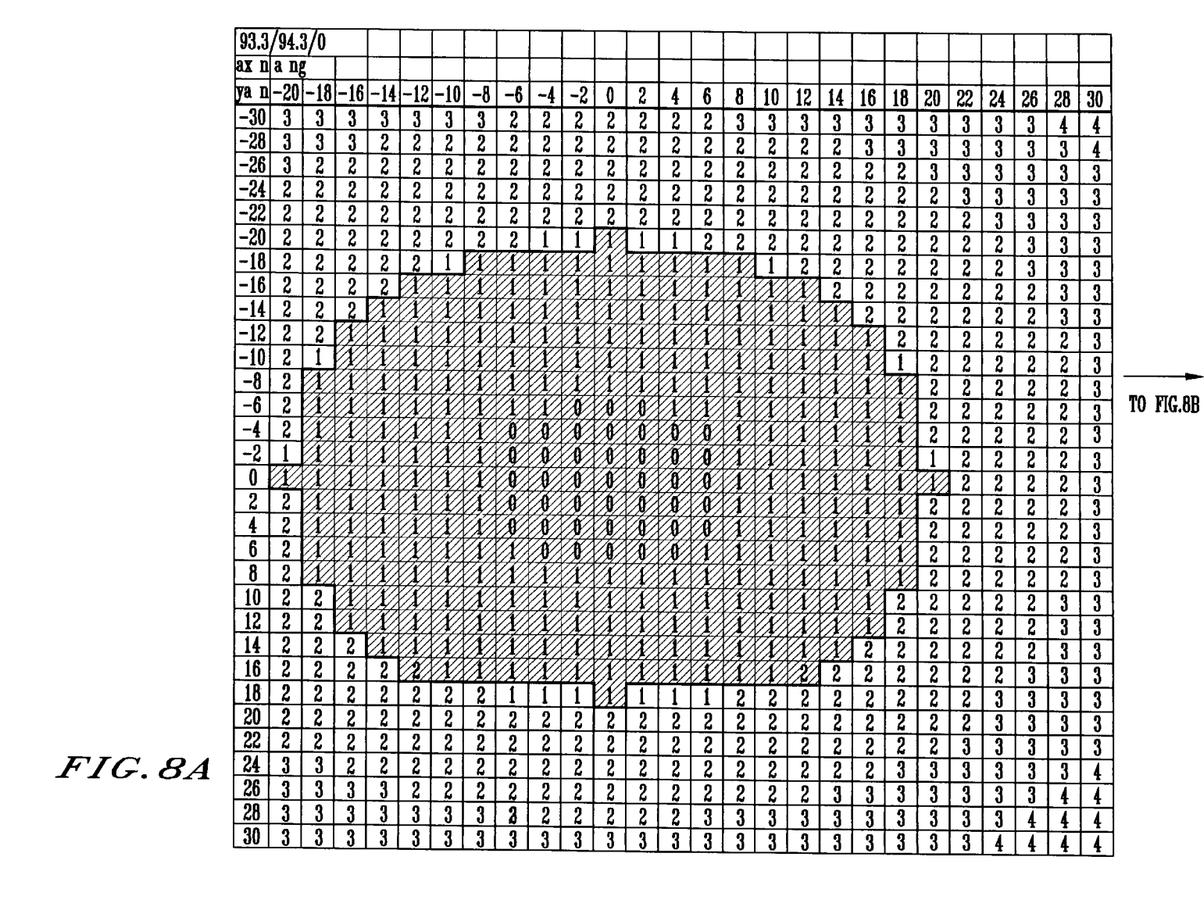
FIGS. 8A–8B is a measurement table mapping the angular offsets of the sighting axis where a visor having a geometry according to those illustrated in FIGS. 5 and 7 is used depending on the orientation of the helmet wearer's eyes.
Figure 8B:
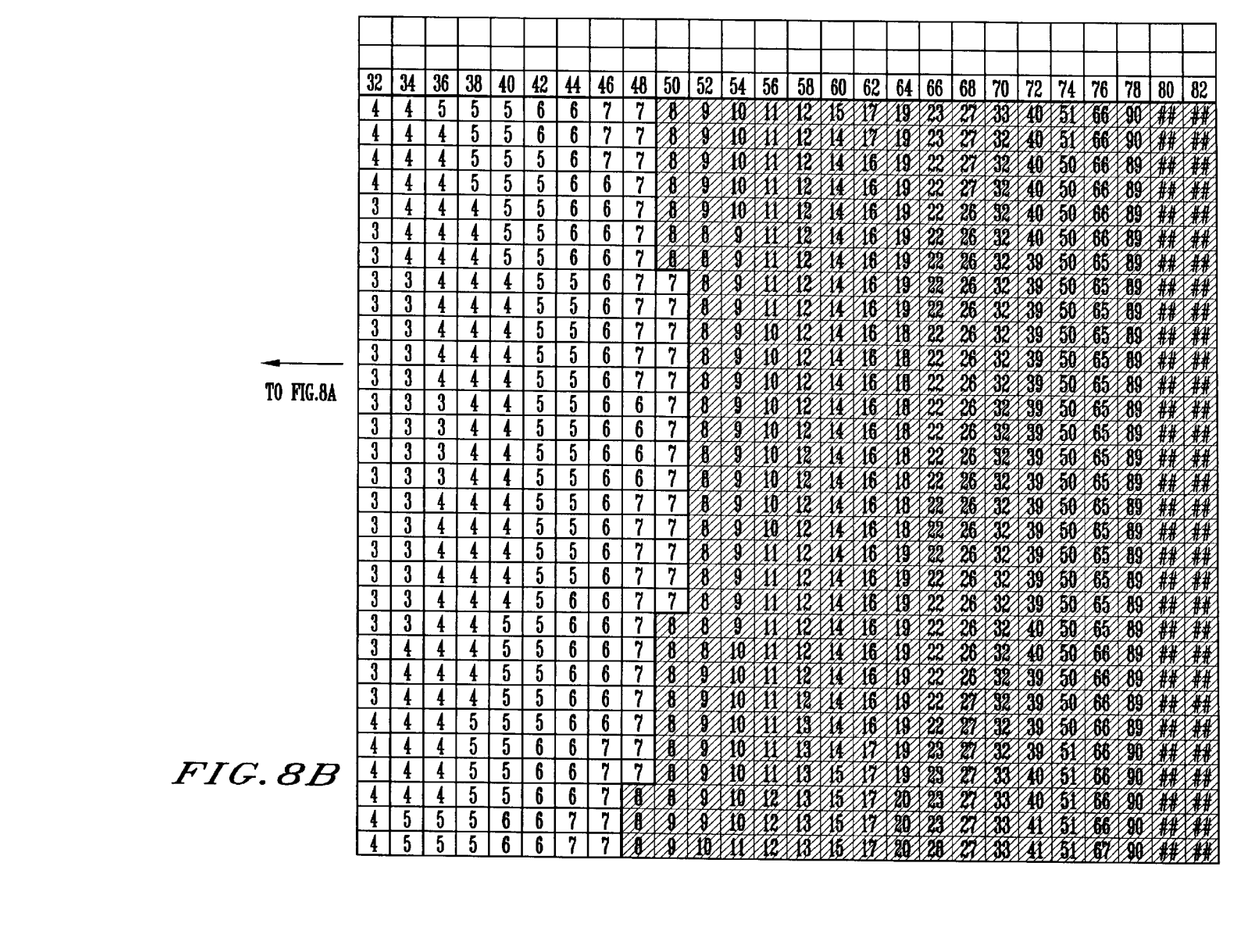

FIGS. 8A–8B is a table mapping the angular offset obtained with the above visor to which a vertical pivot has been applied between the external S2 and internal S1 faces in order to correct the angular offset in the direction of the helmet axis (view of the helmet wearer along the azimuth 0 and the elevation 0 with respect to the visor) and a reduction in the radius of the external face in order to approach the theoretical aspherical shape leading to minimum distortion. Note that the extent of the region of the visor free from angular offset has more than doubled and that the angular offsets at the periphery of this region are considerably decreased. This clearly demonstrates the benefit to be obtained by acting on the relative angular position, in the vertical plane of the two faces of a concentric bispherical visor and on the ratio of the radii of curvature of the two faces of such visor in order to decrease the optical distortions that it cause.

The approximation of the theoretical shape obtained by calculation for the outer face of the visor can be improved by giving the external face of the visor an aspherical shape deduced from the spherical shape adopted above. To be precise, a spherical surface can be defined in Cartesian coordinates by the equation:

$$x^2+y^2+z^2=R^2$$

Or:

$$z=\text{sphere}(x,y)$$

Where R is the radius of the circle. For a surface in the shape of a spherical cap, this is the only parameter which can be acted on apart from its orientation.

The possibilities for adjustment are improved by moving to an aspherical surface defined on the basis of the equation for a sphere with the addition of higher order terms:

$$z=\text{sphere}(x,y)+ah^2+bh^4+ch^6\ldots$$

Where a, b, c are constants and $$h^2=x^2+y^2$$

By virtue of the additional parameters a, b, c, it is possible to approach even more accurately the theoretical shape obtained by the calculation for the outer face of the visor.

More generally, in order to approximate the theoretical shape obtained by the calculation for the external face of the visor, it is possible to start, not from the equation of a sphere but from the equation of a torus, as follows:

$$z=\text{torus}(R,p,x,y)+ah^2+bh^4+ch^6\ldots$$

Where a, b, c are constants which are different from those above and where h is given by:

$$h^2=x^2+y^2$$

The technique which has just been described in order to reduce the angular offsets and therefore the distortions given by a visor, which consists in introducing a pivoting angle in the vertical plane between the two faces of the visor and in acting on the shape of one of the faces of the visor in order to approach a theoretical shape obtained by calculation minimizing the residual angular offsets, is applicable to any type of visor, provided the faces of the visor are initially concentric and bispherical as has been described or that the initial faces of the visor are sphero-toric, spherical-aspherical or aspherical-aspherical, of the bitoric, asphero-toric type or of the "Bézier squares" or other type.

This technique can even be applied repeatedly to the same visor, so as to achieve in steps an increasingly fine correction of the optical distortions caused by the visor. In particular, for a bispherical visor which does not have an internal surface shape imposed by a synthetic image projection system mounted on the helmet, or where such a projection system is absent, or where the optical combiner used by this optical projection system does not contribute to the internal surface of the visor, or even where the visor is only a second visor, after having pivoted one of the two faces of the visor with respect to the other in the vertical plane in order to correct the angular offset in the axis of the helmet, it is possible to replace the spherical shape of the external face of the visor by an aspherical shape approaching the theoretical shape obtained by calculation to minimize distortion, then to calculate on the basis of the visor obtained the theoretical shape to adopt for the internal face of the visor in order to minimize the residual distortions and to replace the spherical shape of the internal face of the visor by an aspherical shape approaching this second theoretical shape in order finally to achieve a bi-aspherical visor with a slight axial displacement of its faces in the vertical plane.

Figure 9:
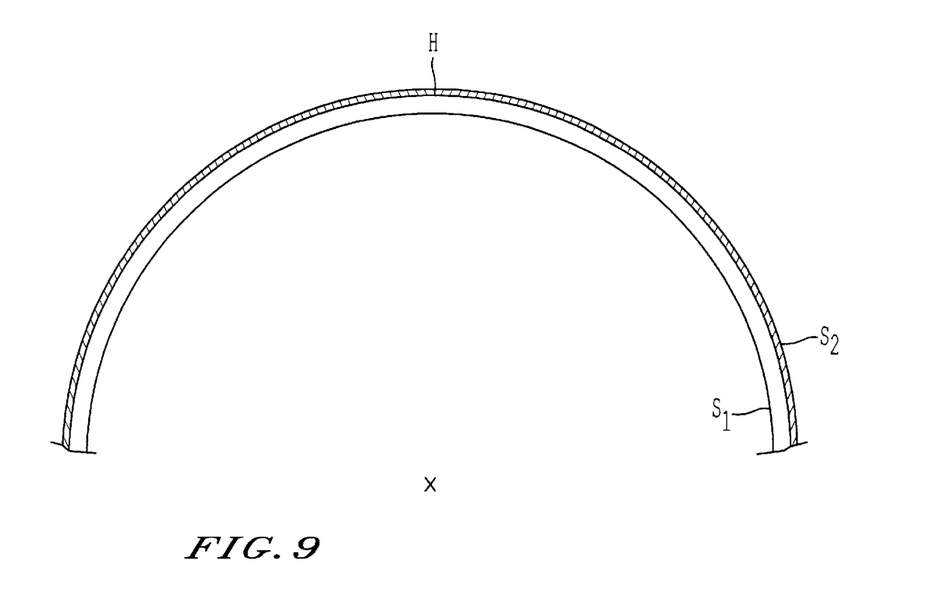
FIG. 9 is a horizontal cross-section of the visor showing the holographic diffraction layer.

The use of correction deviations by the prism effect is not the only means to combat the angular offsets and the distortions of a visor. It is also possible to use a holographic diffraction mask as shown in FIG. 9 on one or both of the faces, one internal and one external, of the visor. As above, modification of the optical properties of the internal face is avoided if the latter is also used to present a synthetic image in front of the helmet wearer's eyes, and if only a single holographic diffraction mask is placed on the external face of the visor.

The holographic diffraction mask is recorded in the usual way on the desired face of the visor. In order to do this, two coherent source points can be used, one real, the other imaginary, placed at the location of the eye of the helmet wearer (fictional position of a cyclops eye between the two helmet wearer's eyes) and the hologram obtained can be recorded in the sensitive gelatin covering the desired face of the visor. This hologram records the perturbation caused by the visor on the light rays reaching the eye of the helmet wearer, with an opposite sign because of the real and imaginary complementary natures of the source points.

However, it is difficult to use a holographic mask over the whole visible spectrum since its color range is large. This technique is particularly useful when it is not sought to keep the color of the scenery intact. The holographic diffraction mask is then assigned the color green, to which the eye is most sensitive. Such a holographic mask can be used for projecting symbology on the visor in the color red. In this case the internal face of the visor is used in the reflection for the color red, whether it comes from the synthetic image projection system or from the scenery. The helmet wearer therefore sees scenery with a degraded red color. This is because it is possible to have, for projecting the symbology, very strong selection of the color red over a very small spectral band occupying only a fraction of the range of the color red perceived by the eye. Thus, only this fraction of the color red of the scenery is not transmitted by the visor but the color red is not lost overall. The helmet wearer perceives the green and blue colors of the scenery. The blue color is not processed by the holographic mask, but that is not much of a problem to the extent that the eye is much less sensitive to this color than to the color green.

What is claimed is:

1. A protective visor for a helmet, comprising:

a transparent wall of generally spherical shape having an internal face and an external face;

said transparent wall having a relative axial displacement of the external face with respect to the internal face in a vertical plane; and said relative axial displacement providing an upward shift of the external face with respect to the internal face through an angle of about half of a degree so as to produce a prismatic effect correcting an angular offset perceived by a helmet wearer in a predetermined direction.

2. A protective visor for a helmet, comprising:

a transparent wall of generally spherical shape having an internal face and an external, face;

said transparent wall having a relative axial displacement of the external face with respect to the internal face in a vertical plane; and said relative axial displacement achieved by a reduction in a ratio of the radius of curvature of the external face with respect to the internal face by about $1/100$th compared to a concentric bispherical visor of constant thickness so as to produce a prismatic affect correcting an angular offset perceived by a helmet wearer in a predetermined direction.

3. The protective visor as claimed in claim 2 wherein said relative axial displacement of said external face with respect to said internal face is formed by adopting a ratio of a radius of curvature of said external face to a radius of curvature of said internal face which is less than that of a concentric bispherical visor of constant thickness.

4. The protective visor as claimed in claim 2, wherein said relative axial displacement of said external face with respect to said internal face is formed by adopting a spherical face and an aspherical face configured, relative to the spherical face, so as to reduce the residual offsets in a region of the visor centered on said predetermined direction.

5. The protective visor as claimed in claim 2 wherein said relative axial displacement of said external face with respect to internal face is formed by adopting a spherical face and an aspherical face of a toric shape configured, relative to the spherical face, so as to reduce the residual offsets in a region of the visor centered on said predetermined direction.

6. A protective visor for a helmet, comprising;

a transparent wall of generally spherical shape having a spherical face and an aspherical face; and said aspherical face approaching a theoretical shape minimizing the distortions, obtained by calculation on the basis of a spherical shape approximated by plane polygonal facets, each facet being reoriented so as to correct the angular offsets that it imposes on the light rays reaching a helmet wearer's eyes, the reoriented facets being repositioned in depth, each one with respect to the others, starting with the center of the visor and finishing at the edges, in order to obtain a faceted surface having minimum roughness and the faceted surface obtained being smoothed by the calculation.

7. The protective visor as claimed in claim 6, wherein said aspherical face approaching a theoretical shape minimizing the distortions, obtained by the calculation, is of a toric shape.

8. A protective visor for a helmet, comprising:

a transparent wall of generally spherical shape having a first aspherical face and a second aspherical face;

said first aspherical face being determined by approximating a first theoretical shape minimizing the distortions inherent to a first initial spherical shape, obtained by calculation on the basis of a spherical shape approximated by plane polygonal facets, each facet being reoriented so as to correct the angular offsets that it imposes on the light rays reaching the helmet wearer's eyes, the reoriented facets being repositioned in depth, each one with respect to the others, starting with the center of the visor and finishing at the edges, in order to obtain a surface having minimum roughness and the faceted surface obtained being smoothed by the calculation; and said second aspherical face being obtained by approximating a second theoretical shape minimizing the distortions inherent to a second initially spherical shape, obtained by calculation on the basis of a spherical shape approximated by plane polygonal facets, each facet being reoriented so as to correct the angular offsets that it imposes on the light rays reaching the helmet wearer's eyes, the reoriented facets being repositioned in depth, each one with respect to the others, starting with the center of the visor and finishing at the edges, in order to obtain a surface having minimum roughness and the faceted surface obtained being smoothed by the calculation.

9. The protective visor as claimed in claim 8, wherein said first aspherical face and said second aspherical face approaching theoretical shapes minimizing the distortions, obtained by the calculation, are of a toric shape.

10. A protective visor for a helmet, comprising:

a transparent wall of generally spherical shape having an internal face and an external face; and said transparent wall having a relative axial displacement of said external face with respect to said internal face, said external face and said internal face comprising two aspherical faces configured one with respect to the other so as to reduce a residual offset in a region of the visor centered on an arbitrary direction so as to produce a prismatic effect correcting an angular offset perceived by a helmet wearer in said arbitrary direction.

11. A protective visor for a helmet, comprising:

a transparent wall of generally spherical shape having an internal face and an external face; and said transparent wall having a relative axial displacement of said external face with respect to said internal face, said external face and said internal face comprising two aspherical faces of a toric shape configured, one with respect to the other, so as to reduce a residual offset in a region of the visor centered on an arbitrary direction so as to produce a prismatic effect correcting an angular offset perceived by a helmet wearer in said arbitrary direction.

* * * * *